United States Patent [19]
McKenney et al.

[11] Patent Number: 6,028,712
[45] Date of Patent: Feb. 22, 2000

[54] OPTICAL SYSTEM AND METHOD FOR PROVIDING CORRECTED OPTICAL IMAGES

[75] Inventors: Dean B. McKenney; Scott W Sparrold; Daniel Harrison; Mills James, all of Tucson, Ariz.

[73] Assignee: Raytheon Company, Lexington, Mass.

[21] Appl. No.: 09/164,436

[22] Filed: Sep. 30, 1998

Related U.S. Application Data

[60] Provisional application No. 60/060,870, Oct. 2, 1997.

[51] Int. Cl.$^7$ .......................... G02B 27/22; G02B 13/06; G02B 7/02
[52] U.S. Cl. .................. 359/642; 359/479; 359/725; 359/637; 359/554; 359/815; 359/753; 244/3.17
[58] Field of Search ........................ 359/642, 725, 359/712, 637, 635, 815, 823, 479, 506, 554, 894, 511, 749, 753; 244/3.17, 3.1

[56] References Cited

U.S. PATENT DOCUMENTS 3,841,585  10/1974  Evers-Euterneck ............ 244/3.17
4,111,558   9/1978  Ikemori ........................ 359/749
5,814,803   9/1998  Olmstead et al. ............... 235/462

Primary Examiner—Georgia Epps
Assistant Examiner—Evelyn A. Lester
Attorney, Agent, or Firm—David W. Collins; Andrew J. Rudd; Glenn H. Lenzen, Jr.

[57] ABSTRACT

An optical system includes a housing having an axis of elongation, and a non-spherical window affixed to the housing. An optical corrector, preferably in the form of an aspherical strip of transparent material, is positioned adjacent to the curved inner surface of the window. The optical corrector is mounted on an optical corrector support, which is rotatable about the axis of elongation. An optical rain is positioned such the the optical corrector lies between the window and the optical train. The optical train includes at least one optical element operable to alter an optical ray incident thereon, and a gimbal upon which the at least one optical element is mounted. The gimbal is pivotable about a transverse axis perpendicular to the axis of elongation. The optical train is mounted on an optical train support, which is movable independently of the optical corrector support. A sensor is positioned to receive the optical ray passing sequentially through the window, the optical corrector, and the optical train.

30 Claims, 3 Drawing Sheets

FORWARD ← → REARWARD

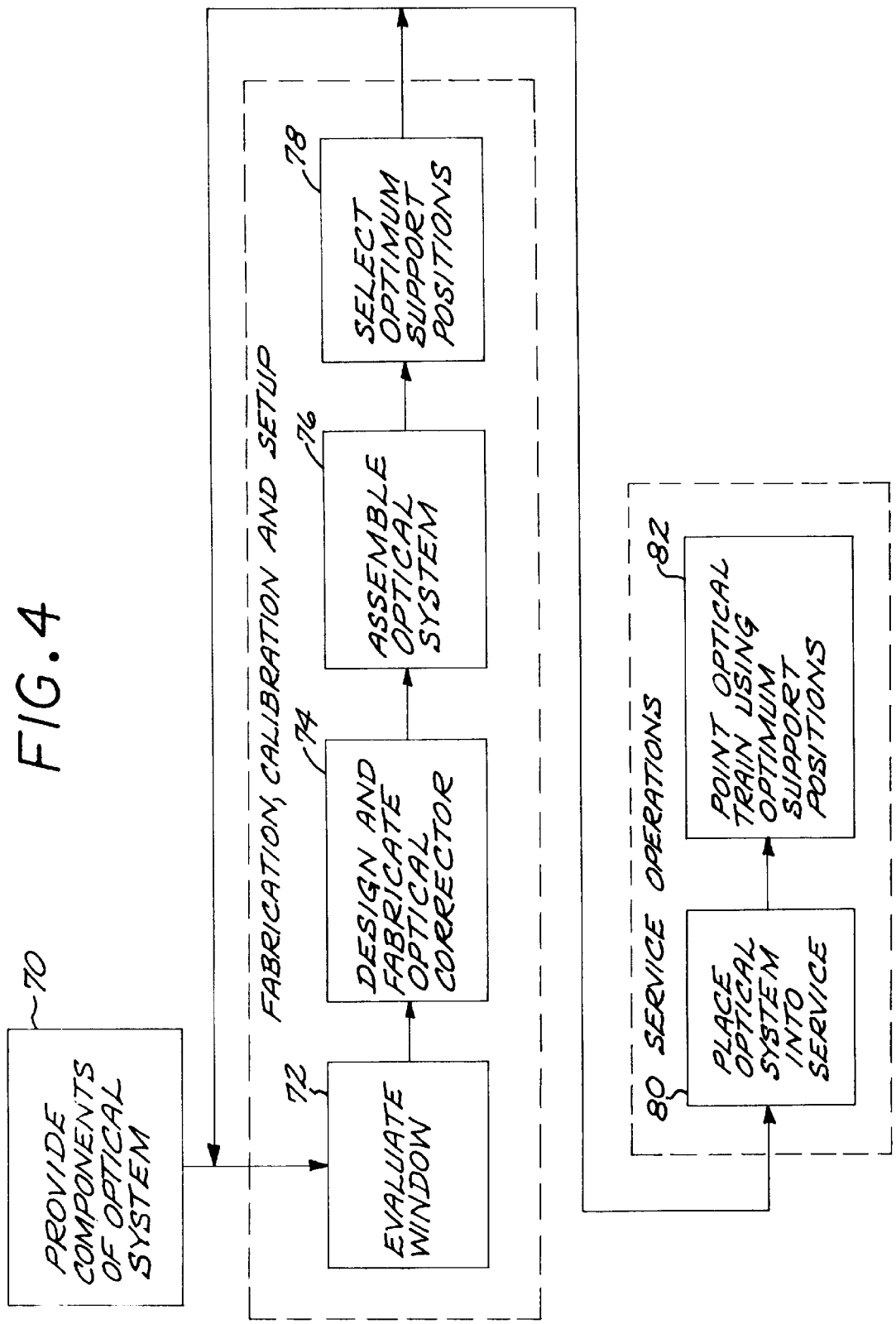

OPTICAL SYSTEM AND METHOD FOR PROVIDING CORRECTED OPTICAL IMAGES

BACKGROUND OF THE INVENTION

This application claim priority to, and the benefit of, U.S. Provisional Applicaion No. 60/060,870, fled Oct. 2, 1997, the disclosure of which is hereby incorporated herein by reference.

This invention relates to an optical system having a window therein, and in particular to such an optical system used with an aspheric window.

An optical sensor receives radiated energy from a scene and converts it to an electrical signal. The electrical signal is provided to a display or further processed for pattern recognition or the like. Optical sensors are available in a variety of types and for wavelengths ranging from the ultraviolet, through the visible, and into the infrared In some applications the optical sensors are fixed in orientation, and in others the optical sensors are movable by pivoting and/or rotational motions to allow sensing over a wide angular field of regard.

The optical sensors generally employ a photosensitive material that faces the scene and produces an electrical output responsive to the incident energy. The photosensitive material and remainder of the sensor structure are rather fragile, and are easily damaged by dirt, erosion, chemicals, or high air velocity. In service, the sensor is placed behind a window through which it views the scene and which protects the sensor from such external effects. The window must be transparent to the radiation of the operating wavelength of the sensor and resist attack from the external forces. The window must also permit the sensor to view the scene over the specified field of regard.

The window would ideally introduce no wavefront aberration at the center of the field of view, other than possibly spherical aberration, particularly if the sensor is an imaging sensor. The thicker and more highly curved is the window, the more likely is the introduction of significant wavefront aberration. A wide variety of sensor windows have been used in various aircraft applications. In many cases such as low-speed commercial helicopters, flat windows are acceptable. Windows that are shaped as segments of spheres are used in aircraft and missile applications, but for these windows the wavefront aberration tends to be high if the gimbal location is not at the spherical center of the window. In all of these window types, if the window must be wide or must project a substantial distance into an airflow to permit a large field of regard, the aerodynamic drag introduced by the window is large.

For applications involving aircraft and missiles operating at high speeds, the window should be relatively aerodynamic such that the presence of the window extending into the a does not introduce unacceptably high and/or asymmetric aerodynamic drag to the vehicle. A nonspherical or conformal window is therefore beneficial to reducing drag and increasing the speed and range of the aircraft. However, available conformal windows introduce large wavefront aberrations into the sensor beam, particularly for high azimuthal pointing angles of the sensor.

The wavefront aberration may be corrected computationally, but the amount of processing may be great. To reduce the amount of computation or eliminate the need for computation, the wavefront aberration of the image may be minimized optically, either in the optical processing components or by providing a particular shape in the window. Available approaches have not been fully successful in accomplishing this type of correction. Accordingly, there is a need for an improved approach to providing a corrected image in an optical system viewing a scene through an aspheric window. The present invention fulfills this need, and further provides related advantages.

SUMMARY OF THE INVENTION

The present invention provides an optical system and a method for providing optical images using the optical system. The optical system is used with many types of aspheric windows. It may be tailored to provide minimal wavefront aberration over a wide range of azimuthal pointing angles of the sensor of the optical system.

In accordance with the invention, an optical system comprises a window having a curved outer surface and a curved inner surface, an optical corrector adjacent to the curved inner surface of the window and comprising an aspheric transparent body, and a movable optical corrector support upon which the optical corrector is mounted. The system further includes an optical train positioned such that the optical corrector lies between the curved window and the optical train. The optical train includes at least one optical element operable to alter an optical ray incident thereon. There is a movable optical train support upon which the optical train is mounted, and a sensor disposed to receive the optical ray passing sequentially through the window, the optical corrector, and the optical train.

The window is preferably mounted in a housing having an axis of elongation. The optical corrector support which preferably comprises a strip of transparent material having an axial component extending along the axis of elongation and a radial component extending outwardly from the axis of elongation, is preferably rotatable about the axis of elongation. The optical corrector support and the optical train sport are also desirably movable parallel to the axis of elongation, with each movement independent of the other.

The optical system thus includes the aspheric window, which introduces an aberration into the optical ray tat is dependent upon the pointing angle of the sensor through the window, and two separately adjustable optical component which can partially or totally negate the introduced aberration. The optical corrector functions as a corrective lens whose position may be rotated about the axis of elongation and/or moved parallel to the axis of elongation. The position of the optical train may also be adjusted along the axis of elongation. These optical components and their adjustability serve to reduce the aberration introduced by the passage of the optical ray through the window. The design of these two optical components, taken together with their movability feature, permits the aberration correction to be custom selected according to the nature of the window. The positions of the optical components which yield the best image as a function of the sensor pointing angle are stored in memory, and these positions are restored during service of the optical system as a function of the pointing angle.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION THE DRAWINGS

FIG. 3A–3C are views of an optical corrector, wherein FIG. 3A is a longitudinal sectional view showing its relation to the window, FIG. 3B is a transverse sectional view taken along line 3B—3B of FIG. 3A, and FIG. 3C is a transverse sectional view taken along line 3C—3C of FIG. 3A; and FIG. 4 is a block flow diagram for an approach to designing, manufacturing, and using the optical system.

DETAILED DESCRIPTION OF THE INVENTION

Figure 1:
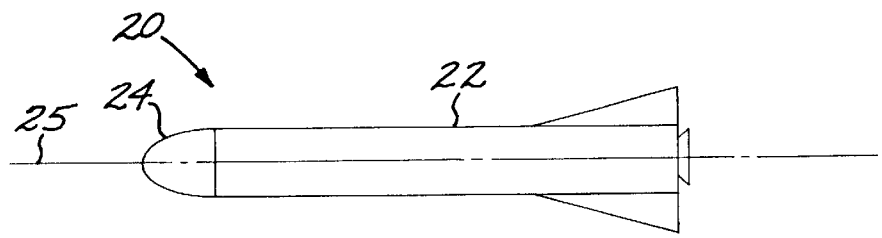
FIG. 1 is an elevational view of a missile having a nose-dome window.

FIG. 1 depicts a flight vehicle, in this case a supersonic missile 20, having a fuselage 22 with a curved window 24 attached thereto. The window 24 is a nose dome that protrudes at least partially into the air of the missile 20. The fuselage is elongated along an axis of elongation 25, and in a preferred application the window 24 is rotationally symmetric about the axis 25. The missile 20 with the nose-dome window 24 is the preferred application of the optical system of the invention, but it is applicable in other contexts as well such as other missile windows and windows on manned aircraft.

Figure 2:
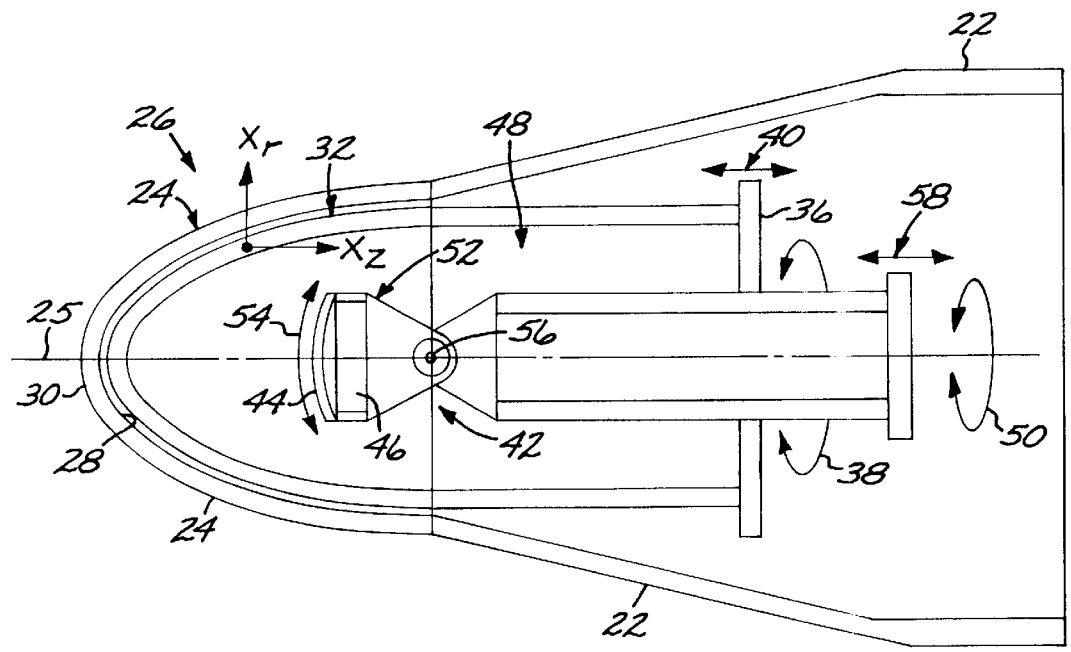
FIG. 2 is a schematic diagram of an optical system according to the invention.

The window 24 is part of an optical system 26, which is shown generally in FIG. 2. The optical system 26 includes the window 24 attached to the fuselage 22, which serves as a housing for the optical system 26. A curved inner surface 28 of the window 24 is the concave surface of the window 24 that faces the inside of the fuselage 22. A curved outer surface 30 of the window 26 is the convex surface of the window 24 that faces outwardly and projects into the airstream as the missile 20 flies. The window 24 has a spatially dependent curvature.

An optical corrector 32 is located adjacent to the inner surface 28 of the window 24. The optical corrector 32 is a curved piece of material transparent to the radiation being sensed by the optical system 26 and its sensor. For example, for a visible radiation optical system the optical corrector 32 may be glass.

Figure 3A:
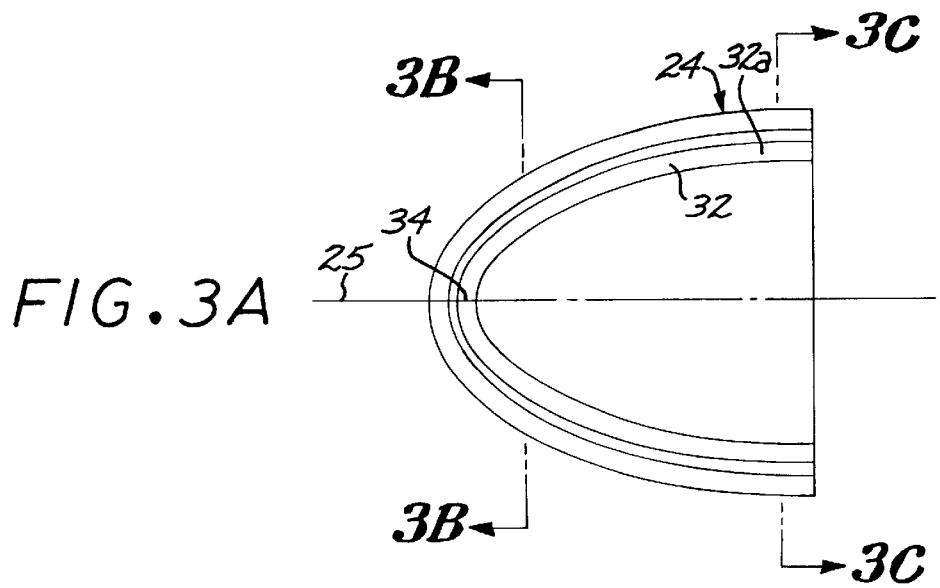
Figure 3B:
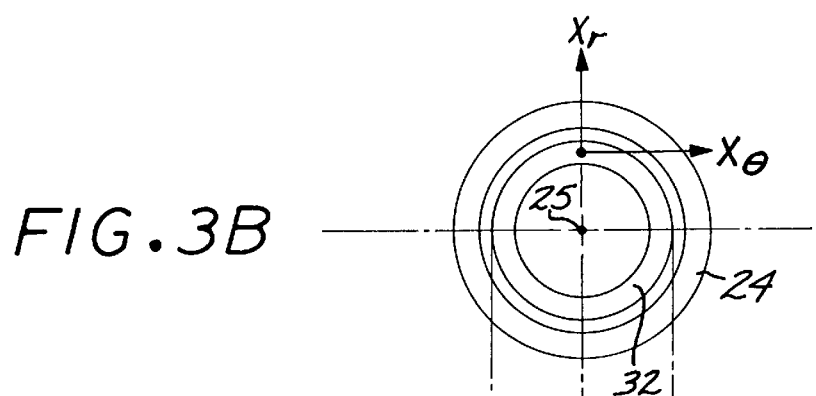
Figure 3C:
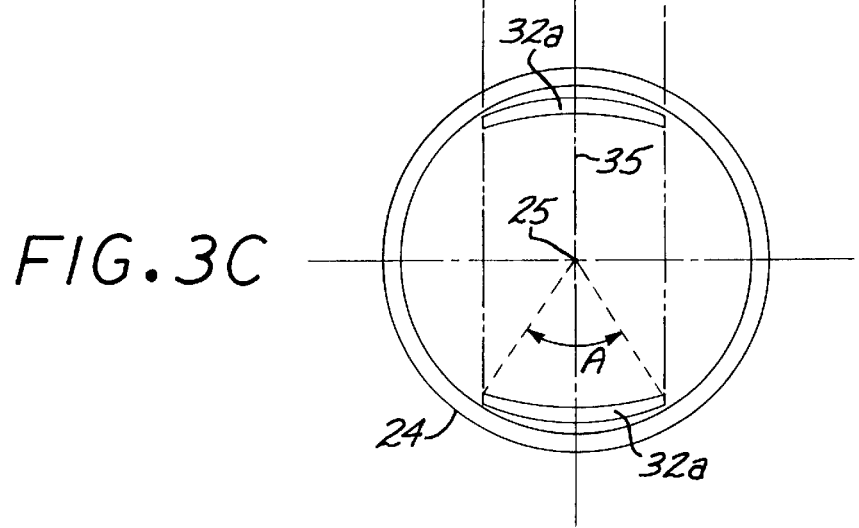

The optical corrector 32 is preferably formed as a piece of the transparent material whose shape has an axial component $X_z$ extending along the axis of elongation 25 (FIG. 2), a radial component $X_r$ extending outwardly from the axis of elongation 25 (FIG. 2), and a circumferential component $X_\theta$ (FIG. 3B). FIGS. 3A–3C illustrative one form of the optical corrector 32. As shown in FIG. 3A, the optical corrector 32 lies adjacent to the inner surface 28 of the window 24, and therefore extends outwardly from the axis of elongation 25 (the $X_r$ component) and rearwardly from a vertex 34 (the $X_z$ component) of the optical corrector 32. The cross section of the optical corrector 32 may be circularly symmetric or nearly circularly symmetric about the axis of elongation 25 at a location near to the vertex 34, as shown in FIG. 3B. At locations further rearwardly from the vertex 34, the optical corrector 32 is formed as at least one strip 32a of the transparent material and preferably two strips 32a as illustrated to balance the loading on its support In longitudinal section, FIG. 3A, the strips 32a generally follow the curvature of the window 24, but may deviate from that curvature to some extent In transverse section perpendicular to the axis of elongation 25, FIG. 3C, each strip 32a is preferably two-fold symmetric about a corrector transverse axis of symmetry 35 and subtends a total arc A about the axis of elongation 25. The use of the strip form of the optical corrector 32 allows the optical corrector to have a curvature and thickness different from that of the window 24, when viewed transversely to the a of elongation 25, as in FIG. 3C. In the illustrated preferred case of FIG. 30, the transverse curvature and thickness variation of the strip 32 are different from the transverse curvature and thickness variation of the window 24.

The optical corrector 32 functions as a lens to correct the aberrations introduced into an optical (light) ray passing through the window 28. Because the aberrations are spatially dependent upon the vector of the optical ray, the optical corrector 32 is formed so that its correction is spatially dependent as well. The aberrations introduced into the optical ray depend upon the exact shape of the window 24, and therefore no specific design may be set forth for the shape of the optical corrector 32. However, some generalizations may be made.

As shown in the longitudinal sectional view of FIG. 3A and the transverse sectional view of FIG. 3C, the optical corrective characteristics (i.e., curvature and/or thickness) of the optical corrector 32 are, in general, a functions of position. The optical corrective characteristics of the optical corrector 32 may vary as a function of location along the axis of elongation 25, as shown in FIG. 3A, and/or as a function of angle about the axis of elongation 25, as shown in FIG. 3C. The curvature and thickness, and hence the optical properties, of the optical corrector 32 are selected to correct aberrations introduced when a light ray passes through the window 24 and thereafter through the optical corrector 32.

The optical corrector 32 is mounted on an movable optical corrector support 36, shown in FIG. 2. The optical corrector support 36 is preferably movable by rotation about the axis of elongation 25, as schematically indicated by arrow 38. The optical corrector support 36 may also be movable by linear movement parallel to the as of elongation 25, as schematically indicated by arrow 40. The rotational and linear movement are produced by conventional actuators, which are known for other purposes.

The rotational movement of the optical corrector support 36, and thence of the optical corrector 32, allows the strip 32a of the optical corrector 32 to be rotationally positioned according to the rotational angle of regard of the optical train to be discussed subsequently. That is, when the optical in is positioned to look downwardly, the optical corrector support 36 would normally be rotationally positioned as shown in FIG. 3C, so that an optical ray entering the optical train must pass through the optical corrector 32. If the optical train is rotated by 90 degrees to look to the left or right, the optical corrector support 36 would normally also be rotated by 90 degrees from the position shown in FIG. 3C so that the incident optical ray must pass therethrough.

The axial movement of the optical corrector support 36, and thence of the optical corrector 32, allows different portions of the optical corrector 32 to be used to correct the aberration introduced by the window 24.

An optical train 42 is positioned such that the optical corrector 32 lies between the window 24 and the optical train 42. The optical train 42 includes at least one optical element operable to alter an optical ray incident thereon. In FIG. 2, the optical element is illustrated as a refractive lens 44, but it may also include a mirror, a prism, or any other operable optical element The optical element may also include a combination of such lenses, mirrors, and/or prisms. The detailed design of optical trains is known in the art, and the present invention is not concerned with such design specifics.

The optical train 42 directs incident optical rays, which previously passed first through the window 24 and then through the optical corrector 32, into a sensor 46. The sensor 46 is illustrated as a focal plane array sensor, but may be of any operable type. The sensor 46 is selected according to the nature of the energy to be sensed, and is typically a sensor of visible light or infrared energy. The design of such sensors 46 is known in the art. The sensor 46 provides its output as an electrical signal to processing electronics, which are not illustrated but which are known in the art.

The optical train 42 is mounted on a movable optical train support 48. The movement characteristics of the optical train support 48 are selected to permit the optical train 42 to point in the desired directions, and also to take advantage of the corrective properties of the optical corrector 32. To allow the optical train 42 to point in the desired directions, a roll/nod movement is illustrated in FIG. 2. The optical train support 48 rotates about the axis of elongation 25, as indicated by arrow 50. A gimbal 52 produces a nodding movement indicated by arrow 54 about a traverse axis 56 that is perpendicular to the axis of elongation 25 (and thence the axis of rotation). The combination of movements 50 and 54 allows the optical train 42 to be pointed in any desired rotational and azimuthal directions. In another approach within the scope of the present invention, the optical train may be mounted on an X-Y rotational gimbal support, which permits the optical train to move about two transverse axes, so that the rotational movement is not required.

The entire optical an 42 may be moved forwardly or rearwardly parallel to the axis of elongation 25 by a linear axial movement, indicated by arrow 58. The axial movement 58 of the optical train support 48 allows the optical train 42 to be positioned for optimal performance relative to the window 24 and to the optical corrector 32. The movements 50, 54, and 58 are produced by conventional actuators which are known for other purposes.

The movements 38 and 40 of the optical corrector 32, and the movements 50, 54, and 58 of the optical train 42, may be rely independent of each other or may be mechanically and/or electrically linked. For example, the rotational movement 38 of the optical corrector 32 may be linked together with, or even accomplished by the same actuator as, the rotational movement 50 of the optical train 42. In that case, the optical in 42 looks through the same portion of the optical corrector 32 for all angles of rotation about the axis of elongation 25. Similar linkages are possible for the axial movements 40 and 58, for example.

FIG. 4 depicts a preferred approach for designing, tailoring, and operating the optical system 26. The physical components of the optical system, as described previously, are provided, numeral 70. The optical corrector 32 is designed and fabricated, and the movements 38,40,50,54, and 58 are interrelated and programed for subsequent service applications, using an iterative procedure, numerals 72, 74, 76, and 78.

First, the optical characteristics of the window 24 are evaluated, numeral 72. This evaluation establishes the nature of the aberration introduced into the wavefront of an incident optical ray as it passes through the window 24, for all relevant incident positions and angles. This evaluation may be performed using conventional optical ray analysis and the known and/or measured shape of the window 24. The shape of the window 24 is dictated to a degree by aerodynamic requirements, but it may also be fine-tuned according to optical requirements.

The required shape and position of the optical corrector 32 are calculated as a function of its position and the incident optical ray positions and angles, using conventional optical ray analysis. The shape and positioning of the optical corrector 32 are chosen to establish selected optical characteristics of the optical beam after it has passed through the window 24 and the optical corrector 32. Examples of such characteristics include deviation of the apparent angle to the target, optical power or focal length as a function of optical ray position and angle, and axially symmetric aberration. The designed shape of the optical corrector 32 is then changed to adjust for asymmetric aberrations such as coma and astigmatism. In this analysis, the symmetric aberrations are chosen to be constant as the elevation angle is changed, whereas the asymmetric aberrations that change with elevation angle are corrected to acceptably small values. The optics of the optical train may also be designed to correct symmetrical aberrations to acceptably small values. In the final stages of the design process the optical elements of the optical train 42 are designed to correct all of the symmetrical aberrations to acceptably small values. These aberrations have been rendered nearly constant by the prior design steps. Based upon this designing process, the optical corrector is fabricated, numeral 74.

The window 24, the optical corrector 32, and the optical train 42 are mounted on the fuselage 22, optical corrector support 36, and optical train support 48, respectively, numeral 76. Test optical signals received at the sensor 46 are evaluated during manufacturing. The associated values of the movements 38,40, 50, 54 and 58 that yield the optimal optical properties are determined and stored, numeral 78. If these received optical signal properties are acceptable and within specifications, the manufacturing and assembly process is complete. Errors and aberrations are also detained and stored, so that they may be accounted for by other processing. If the results achieved are not acceptable, the steps 72, 74, 76, and 78 are repeated as necessary until acceptable results are obtained. Typically, the modification is achieved by reworking the optical corrector 32 until its properties are acceptable, by polishing, grinding, machining and other known working operations.

The shape of the optical corrector 32 may not be stated in any general form, inasmuch as it depends upon the shape and optical characteristics of the window 24, and is determined in the above-described design process. However, in a typical case, as shown in FIGS. 2 and 3A, the optical corrector typically conforms to the shape of the window 24 fairly closely but not necessary exactly, when the window and the optical corrector are viewed in the longitudinal section of FIG. 3A. However, the optical corrector 32 typically does not conform to the shape of the window 24 when viewed in transverse section in the strip section of the optical corrector, as seen in FIG. 3C.

Once the optical corrector 32 is fabricated and the positions of the movements 38, 40, 50, 54, and 58 yielding acceptable optical properties are known, the missile is placed into service, numeral 80. When the optical system 26 is to be used during service, the angular positions of the movements 50 and 54 are typically chosen in order to point the optical train 42 along a desired line of sight. The optimum angular positions of the other movements 38, 40, and 58 (collectively, the "support positions"), associated with those desired angular positions of the movements 50 and 54, are recalled from the memory established during the initial manufacturing and calibration operation, steps 72, 74, 76, and 78, and set using the respective actuators. The result is an optimum image reaching the sensor 46 for all desired viewing (pointing) angles of the optical train.

Although a particular embodiment of the invention has been described in detail for purposes of illustration, various modifications and enhancements may be made without departing from the spirit and scope of the invention Accordingly, the invention is not to be limited except as by the appended claims.

What is claimed is:

1. An optical system, comprising:
    a window having a curved outer surface and a curved inner surface;
    an optical corrector adjacent to the curved inner surface of the window, the optical corrector comprising an aspheric transparent body having a shape and position selected responsive to a shape of the window to establish selected optical characteristics of an optical ray after it has passed through the window and the optical corrector;
    a movable optical corrector support upon which the optical corrector is mounted;
    an optical train positioned such that the optical corrector lies between the curved window and the optical train, the optical train including at least one optical element operable to alter the optical ray incident thereon;
    a movable optical train support upon which the optical train is mounted; and
    a sensor disposed to receive the optical ray passing sequentially through the window, the optical corrector, and the optical train.

2. The optical system of claim 1, wherein the optical corrector comprises a strip of transparent material having a curvature different from a curvature of the window.

3. The optical system of claim 1, wherein the window is mounted to a housing having an axis of elongation.

4. The optical system of claim 3, wherein the optical corrector support is movable in a direction parallel to the axis of elongation.

5. The optical system of claim 3, wherein the optical corrector support is rotatable about the axis of elongation.

6. The optical system of claim 3, wherein the optical train support is movable in a direction parallel to the axis of elongation.

7. The optical system of claim 1, wherein the optical train support includes
    a gimbal upon which said at least one optical element is mounted.

8. The optical system of claim 1, wherein the optical element is selected from the group consisting of a lens, a mirror, and a prism.

9. The optical system of claim 1, wherein the window is a portion of an aircraft.

10. An optical system, comprising:
    a housing having an axis of elongation;
    a non-spherical transparent window affixed to the housing, the window having a window curvature and an inner surface;
    an optical corrector adjacent to the curved inner surface of the window, the optical corrector comprising a strip of a transparent material having an axial component extending along the axis of elongation and a radial component extending outwardly from the axis of elongation, and having a strip curvature different from that of the window curvature;
    an optical corrector support upon which the optical corrector is mounted, the optical corrector support being rotatable about the axis of elongation;
    an optical train positioned such that the optical corrector lies between the window and the optical train, the optical train including at least one optical element operable to alter an optical ray incident thereon;
    an optical train support upon which the local train is mounted, the optical train support comprising a gimbal upon which the at least one optical element is mounted; and
    a sensor disposed to receive the optical ray passing sequentially through the window, the optical corrector, and the optical train.

11. The optical system of claim 10, wherein the optical train support is movable in the direction parallel to the axis of elongation.

12. The optical system of claim 10, wherein the optical train support is rotatable about the axis of elongation.

13. The optical system of claim 10, wherein the optical corrector support is movable in a direction parallel to the axis of elongation.

14. The optical system of claim 10, wherein the optical element is selected from the group consisting of a lens, a mirror, and a prism.

15. The optical system of claim 10, wherein the optical train support is movable independently of the optical corrector support.

16. The optical system of claim 10, wherein a curvature of the optical corrector is different from a curvature of the inner surface of the window.

17. The optical system of claim 10, wherein the housing is a portion of an aircraft, and the window is a portion of an aircraft.

18. A method for providing corrected optical images, comprising the steps of
    providing an optical system, comprising:
        a window having a curved outer surface and a curved inner surface,
        an optical corrector adjacent to the curved inner surface of the window, the optical corrector comprising an aspheric transparent body having a shape and position selected responsive to a shape of the window to establish selected optical characteristics of an optical ray after it has passed through the window and the optical corrector,
        a movable optical corrector support upon which the optical corrector is mounted,
        an optical train positioned such that the optical corrector lies between the window and the optical train, the optical train including at least one optical element operable to alter the optical ray incident thereon,
        a movable optical train support upon which the optical train is mounted, and
        a sensor disposed to receive the optical ray passing sequentially through the window, the optical corrector, and the optical train;
    designing and fabricating the optical corrector responsive to the window optical properties to provide an acceptable optical ray reaching the sensor, as a function of a pointing angle of the optical train;
    selecting a set of support positions for the optical corrector support and the optical train support as a function of the pointing angle, to provide an optimal optical ray reaching the sensor for each pointing angle of the optical train; and
    operating the optical system in service, the step of operating including the step of
        establishing the set of support positions responsive to a pointing angle commanded during operation.

19. The method of claim 18, wherein the step of designing and fabricating includes the step of:

selecting a shape of the optical corrector.

20. An optical system, comprising:

a window having a curved outer surface and a curved inner surface;

an optical corrector adjacent to the curved inner surface of the window, the optical corrector comprising an aspheric transparent body;

a movable optical corrector support upon which the optical corrector is mounted, an optical train positioned such that the optical corrector lies between the curved window and the optical train, the optical train including at least one optical element operable to alter an optical ray incident thereon, wherein the optical train support includes a gimbal upon which said at least one optical element is mounted;

a movable optical train support upon which the optical train is mounted; and a sensor disposed to receive the optical ray passing sequentially through the window, the optical corrector, and the optical train.

21. The optical system of claim 20, wherein the optical corrector comprises a strip of transparent material having a curvature different from a curvature of the window.

22. The optical system of claim 20, wherein the window is mounted to a housing having an axis of elongation.

23. The optical system of claim 22, wherein the optical corrector support is movable in a direction parallel to the axis of elongation.

24. The optical system of claim 22, wherein the optical corrector support is rotatable about the axis of elongation.

25. The optical system of claim 22, wherein the optical train support is movable in a direction parallel to the axis of elongation.

26. The optical system of claim 20, wherein the window is a portion of an aircraft.

27. An optical system, comprising:

a housing having an axis of elongation;

a window having a curved outer surface and a curved inner surface, the window being mounted to the housing;

an optical corrector adjacent to the curved inner surface of the window, the optical corrector comprising an aspheric transparent body, wherein the optical corrector support is movable in a direction parallel to the axis of elongation;

a movable optical corrector support upon which the optical corrector is mounted;

an optical train positioned such that the optical corrector lies between the curved window and the optical train, the optical train including at least one optical element operable to alter an optical ray incident thereon;

a movable optical train support upon which the optical train is mounted; and a sensor disposed to receive the optical ray passing sequentially through the window, the optical corrector, and the optical train.

28. The optical system of claim 27, wherein the housing is a portion of an aircraft, and the window is a portion of an aircraft.

29. An optical system, comprising:

a housing having an axis of elongation;

a window having a curved outer surface and a curved inner surface, the window being mounted to the housing;

an optical corrector adjacent to the curved inner surface of the window, the optical corrector comprising an aspheric transparent body;

a movable optical corrector support upon which the optical corrector is mounted;

an optical train positioned such that the optical corrector lies between the curved window and the optical train, the optical train including at least one optical element operable to alter an optical ray incident thereon;

a movable optical train support upon which the optical train is mounted, wherein the optical train support is movable in a direction parallel to the axis of elongation; and a sensor disposed to receive the optical ray passing sequentially through the window, the optical corrector, and the optical train.

30. The optical system of claim 29, wherein the housing is a portion of an aircraft, and the window is a portion of an aircraft.

* * * * *